United States Patent [19]
Iwamoto et al.

[11] Patent Number: 6,021,812
[45] Date of Patent: Feb. 8, 2000

[54] BALL PLUG VALVE

[75] Inventors: Kunio Iwamoto, Osaka; Tadashi Ogawa; Hitoshi Ishiyama, both of Saitama; Hideki Wakahara, Tokyo, all of Japan

[73] Assignee: Sekisui Kagaku Kogyo Kabushiki Kaisha & Ichinose Co., Ltd., Osaka, Japan

[21] Appl. No.: 09/077,923

[22] PCT Filed: Nov. 14, 1996

[86] PCT No.: PCT/JP96/03350

§ 371 Date: Jun. 1, 1998

§ 102(e) Date: Jun. 1, 1998

[87] PCT Pub. No.: WO98/14727

PCT Pub. Date: Apr. 9, 1998

[30] Foreign Application Priority Data

Sep. 30, 1996 [JP] Japan ..................................... 8-276951

[51] Int. Cl.[7] .................................................. F16K 11/087
[52] U.S. Cl. .................................... 137/625.3; 137/625.32
[58] Field of Search ............................ 137/625.3, 625.32

[56] References Cited

U.S. PATENT DOCUMENTS 3,773,291 11/1973 Grauer ...................................... 251/315
4,881,718 11/1989 Champagne ............................. 251/209
5,524,863 6/1996 Davis ....................................... 251/127

FOREIGN PATENT DOCUMENTS

| 0309678 | 7/1988 | European Pat. Off. .......... F16K 5/10 |
| 0376502 | 1/1989 | European Pat. Off. .......... F16K 5/06 |
| 55107165 | 8/1980 | Japan . |
| 329656 | 8/1987 | Japan . |
| 462969 | 5/1992 | Japan . |
| 8312806 | 11/1996 | Japan . |
| 9109243 | 6/1991 | WIPO . |
| 9407063 | 3/1994 | WIPO ............................... F16K 5/10 |

*Primary Examiner*—John Fox
*Attorney, Agent, or Firm*—Dvorak & Orum

[57] ABSTRACT

In a ball plug valve (10) which has a main opening (14) and an auxiliary opening (14) A serving as the inlet openings of a flow through hole (13) of a ball (12) and which has a sectorial opening (15) serving as an outlet opening thereof; it is set so that a tip (15) A of the sectorial opening (15) is in a first sealing region (17) A provided by an outlet sealing member near an outlet passage when the valve is fully closed, while the tip (15) A of the sectorial opening (15) passes across the outlet passage and enters a second sealing region (17) B provided by an outlet sealing member when the valve is fully opened.

7 Claims, 13 Drawing Sheets

(A)

(B)

(C)

(A)

(B)

(A)

(B)

(C)

(A)

(B)

(C)

(A)

(B)

(C)

(A)

(B)

(C)

BALL PLUG VALVE

FIELD OF THE INVENTION

The present invention relates to a ball plug valve.

BACKGROUND ART

Hitherto, as a ball plug valve, there has been one disclosed in Japanese Examined Utility Model Publication No. 3-29656 wherein, between an inlet passage and an outlet passage of a valve body, there is a ball which has a flow through hole and sealing members respectively in contact with the ball on both opening ends thereof, a control section and the ball are connected via a valve stem, and an opening on the inlet end of the flow through hole is circular, while the opening on the outlet end is sectorial.

According to the ball plug valve, the valve can be fully opened or closed by rotating the ball 90 degrees, permitting quick and easy operation, whereas a handle has to be turned several times or a few tens of times as in the case of a sluice valve. The two sides intersecting at the tip of the sectorial opening are shaped into a convex curve which bulges toward the centerline of the opening so that the flow characteristic exhibits an equal percent characteristic (the increasing flow percentage is equal to the same increment as valve opening). Likewise, the aforesaid two sides are shaped into a sectorial curve with respect to the centerline of the opening so that the flow characteristic exhibits a linear characteristic (the flow rate is changed in direct proportion to the opening of the valve) (Japanese Un-Examined Patent Publication No. 55-107165).

In the prior art, however, it is set such that the tip of the sectorial opening is in a sealing region which is formed by a sealing member on the outlet end which is still far away from an outlet passage when the valve is fully closed, whereas the tip of the sectorial opening is still in the outlet passage when the valve is fully open. This has been posing problems ①, ②, and ③ below:

① When opening the valve through the control section, it takes time for a fluid to start flowing because of a long floating distance in which the tip of the sectorial opening passes by the sealing members and reaches the outlet passage.

② When the valve is fully open, since the tip of the sectorial opening is still in the outlet passage, the effective rotational angle range of the ball which connects the sectorial opening to the outlet passage is relative small, thus limiting the band wherein the fluid is controlled through the control section.

③ An electric actuator could be used for the control section to expand the fluid control band wherein input signals issued through the control section are effective; however, the resolution of the control section would be deteriorated accordingly, resulting in deteriorated fluid control accuracy.

DISCLOSURE OF THE INVENTION

An object of the present invention is to achieve a quicker flow start of a fluid after a valve is opened through a control section, a broader band wherein the fluid is controlled through the control section, and higher fluid control accuracy in a ball plug valve.

According to the present invention described in claim 1, there is provided a ball plug valve in which a ball having a flow through hole therein and sealing members which are respectively in contact with both opening ends of the ball are installed between an inlet passage and an outlet passage of a valve body, a control section is connected with the ball via a valve stem, and an opening on the outlet end of the flow through hole of the ball is sectorial; wherein it is set such that the tip of the sectorial opening lies in a first seating region provided by an outlet sealing member near the outlet passage when the valve is fully closed, while the tip of the sectorial opening passes across the outlet passage and enters a second sealing region provided by an outlet sealing member when the valve is fully opened, the inlet opening of the flow through hole of the ball is composed of a main opening and an auxiliary opening, and the auxiliary opening causes the foregoing inlet passage to communicate with the flow through hole at the opening start of the valve when the tip of the sectorial opening passes by the first sealing region, while the main opening causes the inlet passage to communicate with the flow through hole after the valve starts to open.

According to the invention described in claim 2, the foregoing flow through hole of the ball is composed of a intra-valve passage which provides smooth connection between the main opening and the sectorial opening in the invention described in claim 1.

According to the invention described in claim 3, the foregoing flow through hole of the ball is composed of a intra-valve passage which is shaped convexly toward the inside of the flow through hole in the invention described in claim 1 or 2.

According to the invention described in claim 4, the ball plug valve is further equipped with a communicating passage which puts the flow through hole on the main opening end of the ball in communication with a valve chamber around the ball, and a communicating passage which puts the flow through hole on the sectorial opening end in communication with the valve chamber around the ball in the invention described in any one of claims 1 to 3.

The invention described in claim 1 provides operations set forth in ①, ②, and ③ below:

① When the valve is fully closed, the tip of the sectorial opening is set in the first sealing region formed by the outlet sealing member near the outlet passage. This shortens the floating distance wherein the tip of the sectorial opening passes by the sealing member and reaches the outlet passage after the valve is opened through the control section, thus achieving a quicker flow start of a fluid.

② When the valve is fully opened, the tip of the sectorial opening passes across the outlet passage and enters the second sealing region formed by the outlet sealing member. Hence, the effective rotational angle range of the ball which connects the sectorial opening to the outlet passage is relatively large, broadening the band wherein the fluid is controlled through the control section.

③ The fluid control band mentioned in ② is broadened by the shape of the sectorial opening, and therefore, the resolution of the control section will not be affected, thus permitting higher fluid control accuracy.

The invention described in claim 2 provides an operation set forth in ④ below:

④ The flow through hole of the ball is composed of the intra-valve passage which provides the smooth connection between the main opening and the sectorial opening by a tapered passage surface or the like, thus permitting a lower passage drag of the valve.

The invention described in claim 3 provides an operation set forth in ⑤ below:

⑤ The passage surface of the flow through hole of the ball is convex inward. This enables a valve capacity coefficient (Cv value) to be increased to secure a large flow rate by controlling, for example, the occurrence of a turbulence caused by a flow coming off the intra-valve passage on the end where the intra-valve flow velocity is high on the fully opened valve end.

The invention described in claim 4 provides an operation set forth in ⑥ below:

⑥ The flow through hole of the ball on the main opening end is equipped with the communicating passage communicated with a valve seat around the ball, while the flow through hole on the sectorial opening end is equipped with the communicating passage communicated with valve chamber around the ball.

Therefore, the flow through hole of the ball produces a contraction flow from the main opening end to the sectorial opening end, and the flow velocity is higher at the sectorial opening than the main opening. This causes the static pressure at the main opening end to become lower than at the sectorial opening end and a resultant differential pressure is produced; therefore, the fluid jets into the valve chamber through the communicating passage at the main opening end, while the fluid is drawn into the flow through hole through the communicating passage at the sectorial opening end. Thus, the fluid flows through the flow through hole in the ball and the valve chamber around the ball at the same time, so that the valve chamber does not become a dead space (liquid reservoir). Hence, the fluid does not cause such an inconvenience as the generation of bacteria which may be observed in a dead space, thus making the ball plug valve ideally suited for controlling the flow of pure water or ultrapure water or for other similar applications.

BEST MODE FOR CARRYING OUT THE INVENTION (First Embodiment) (FIG. 1 through FIG. 3, FIG. 6)

Figure 1:
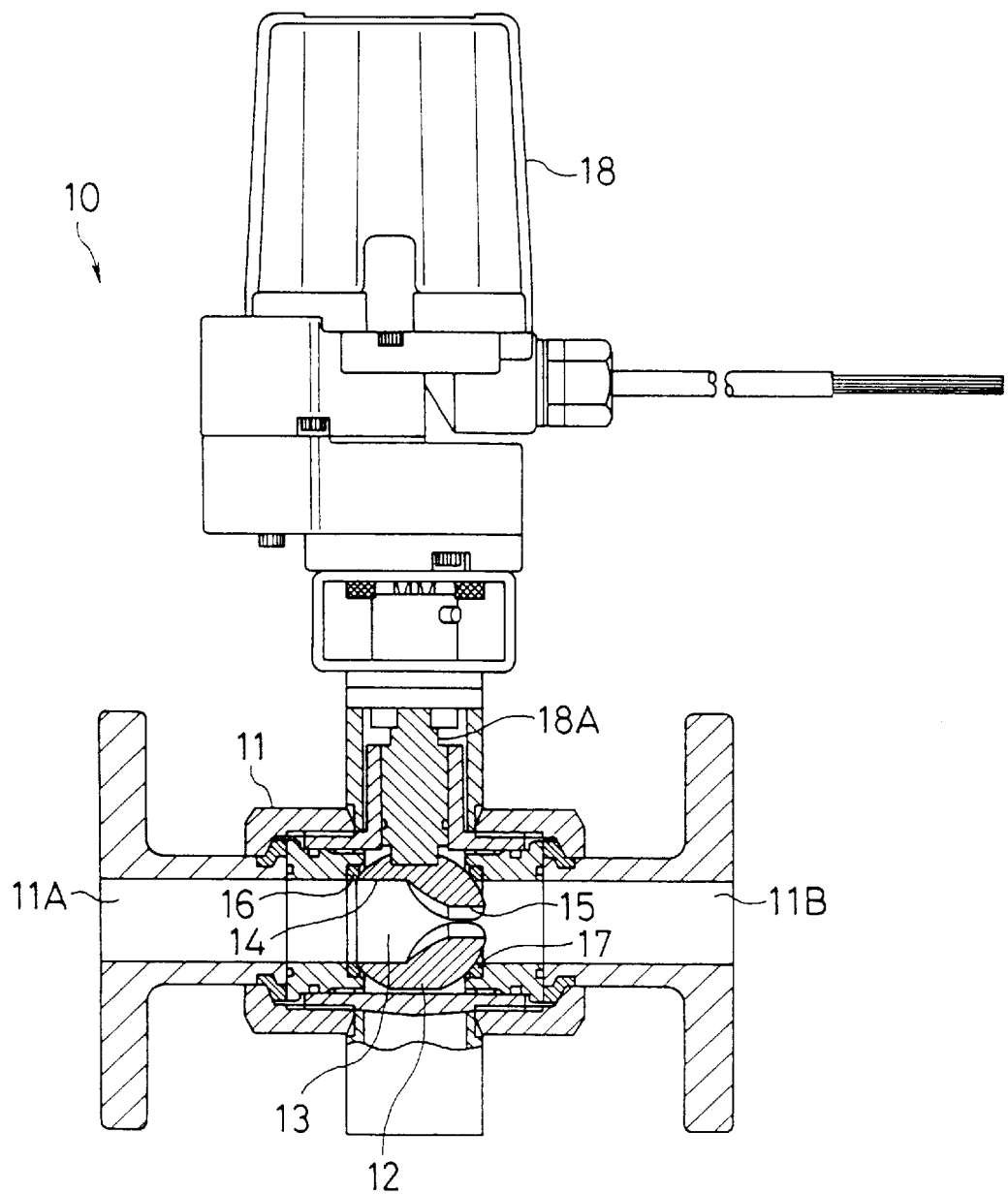
FIG. 1 is a schematic diagram showing a ball plug valve according to a first embodiment.

As shown in FIG. 1, in a ball plug valve 10, a ball 12 having a flow through hole 13 and sealing members 16 and 17, which are respectively in contact with both openings 14 and 15 of the ball 12 are disposed between an inlet passage 11A and an outlet passage 11B of a valve body 11. A control section 18, which is composed of an electric actuator, and the ball 12 are connected via a valve stem 18A.

Figure 2:
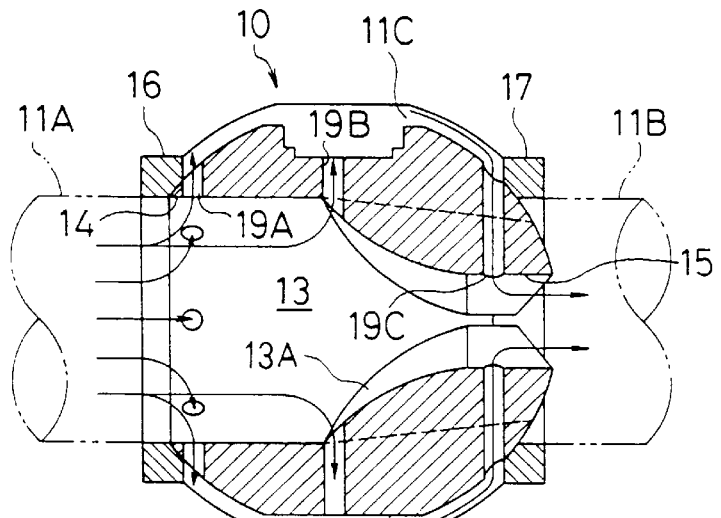
FIGS. 2a–2c are schematic diagrams showing an essential section of the ball plug valve.
Figure 2:
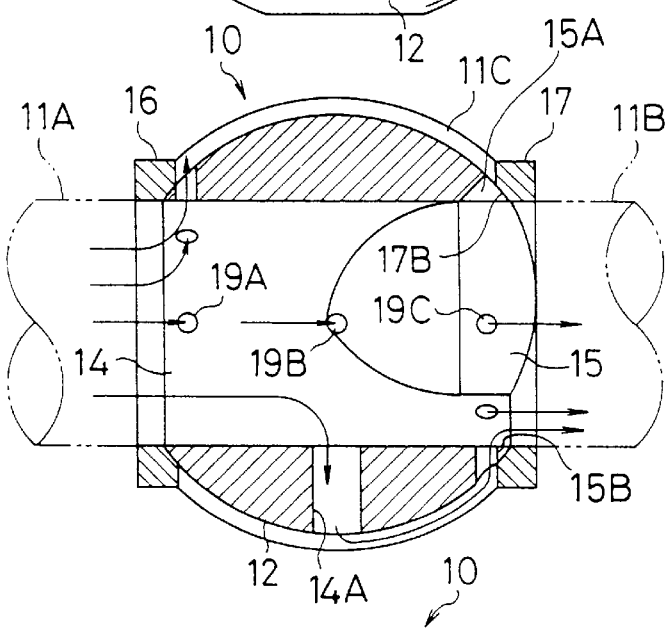
Figure 2:
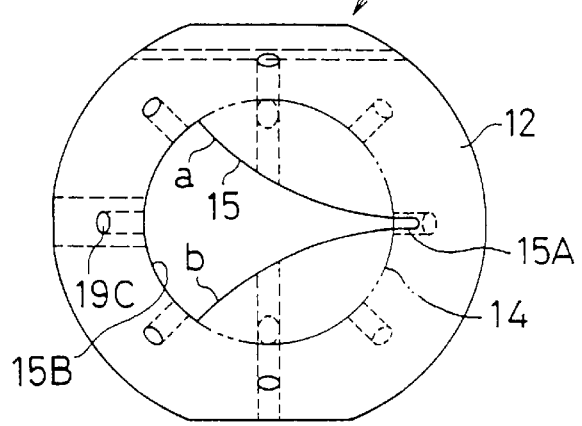
Figure 3:
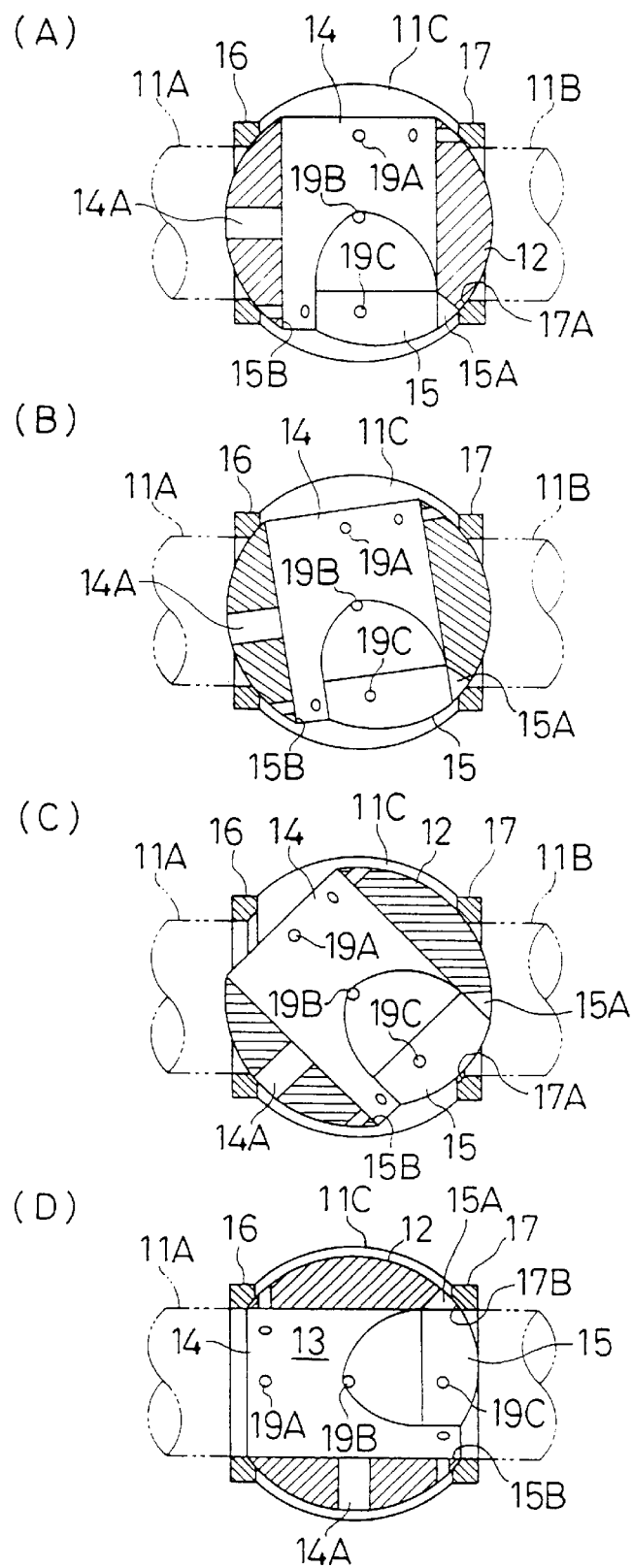
FIGS. 3a–3d are schematic diagrams showing the opening of the ball plug valve.

At this time, in the ball plug valve 10, the opening 14 on the inlet end of the flow through hole 13 of the ball 12 is a circular main opening, while the opening 15 on the outlet end is a sectorial opening as illustrated in FIG. 2 and FIG. 3.

When the ball plug valve 10 is fully closed, a tip (extended section) 15A of the sectorial opening 15 is set in a first sealing region 17A formed by the outlet sealing member 17 near the outlet passage 11B as illustrated in FIG. 3(A). When the valve is fully opened, as shown in FIG. 2 and FIG. 3(D), the tip 15A of the sectorial opening 15 passes across the outlet passage 11B and enters a second sealing region 17B provided by the outlet sealing member 17; a larger end section 15B of the sectorial opening 15 is aligned with the peripheral section of the outlet passage 11B without entering the outlet passage 11B, thus widely opening the sectorial opening 15 over the entire outlet passage 11B in the circumferential direction of the rotation of the ball 12.

Further, the ball plug valve 10 has, as an inlet opening of the flow through hole 13 of the ball 12, an auxiliary aperture 14A which is isolated in the rotational circumferential direction of the circular main opening 14 and the ball 12, in addition to the circular main opening 14. The auxiliary opening 14A causes the inlet passage 11A to communicate with the flow through hole 13 at the start of valve opening when the tip 15A of the sectorial opening 15 passes by the fining 14 causes the inlet passage 11A to communicate with the flow through hole 13 after the valve starts to open (FIGS. 3(C) and (D)).

In the ball plug valve 10, the flow through hole 13 of the ball 12 is composed of an intra-valve passage which provides smooth connection between the circular main opening 14 and the sectorial opening 15 by a tapered passage surface 13A (FIG. 2(A)) or the like.

Further, in the ball plug valve 10, the passage surface 13A of the flow through hole 13 of the ball 12 is shaped convexly toward the inside of the flow through hole 13 (FIG. 2(A)).

The ball plug valve 10 is further equipped with aperture-shaped communicating passages 19A, 19B, and 19C, which put the flow through hole 13 in communicate with the valve chamber 11C around the ball 12, at the side of the circular main opening 14, the middle, and the side of the sectorial opening 15, respectively, of the ball 12. The contraction flow produced through the flow through hole 13 of the ball 12 in the course from the circular main opening 14 to the sectorial opening 15 causes a change in the static pressure in the flow through hole 13. This in turn causes the fluid in the communicating passages 19A and 19B to jet out from the flow through hole 13 to the valve chamber 11C; in the communicating passage 19C, the fluid is drawn from the valve chamber 11C into the flow through hole 13 (FIGS. 2(A) and (B)).

The operation of this embodiment will now be described.

① When the valve is fully closed, the tip 15A of the sectorial opening 15 is set in the first sealing region 17A formed by the outlet sealing member 17 near the outlet passage. This shortens the floating distance wherein the tip 15A of the sectorial opening 15 passes by the sealing member 17 and reaches the outlet passage 11B after the valve is opened through the control section 18, thus achieving a quicker flow start of a fluid.

②  When the valve is fully opened, the tip 15A of the sectorial opening 15 passes across the outlet passage 11B and enters the second sealing region 17B formed by the outlet sealing member 17. Hence, the effective rotational angle range of the ball 12 which connects the sectorial opening 15 to the outlet passage 11B is relatively large, broadening the band wherein the fluid is controlled through the control section 18.

③ The fluid control band mentioned in ② above is broadened by the shape of the sectorial opening 15, and therefore, the resolution of the control section 18 will not be affected, thus permitting higher fluid control accuracy.

④ The flow through hole 13 of the ball 12 is composed of the intra-valve passage which provides the smooth connection between the circular main opening 14 and the sectorial opening 15 by the tapered passage surface 13A or the like, thus permitting a lower passage resistance of the valve.

⑤ The passage surface 13A of the flow through hole 13 of the ball 12 is convex inward. This enables a valve capacity coefficient (Cv value) to be increased to secure a large flow rate by suppressing, for example, the occurrence of a turbulence caused by a flow coming off the intra-valve passage on the end where the intra-valve flow velocity is high at the fully opened valve end.

Figure 6:
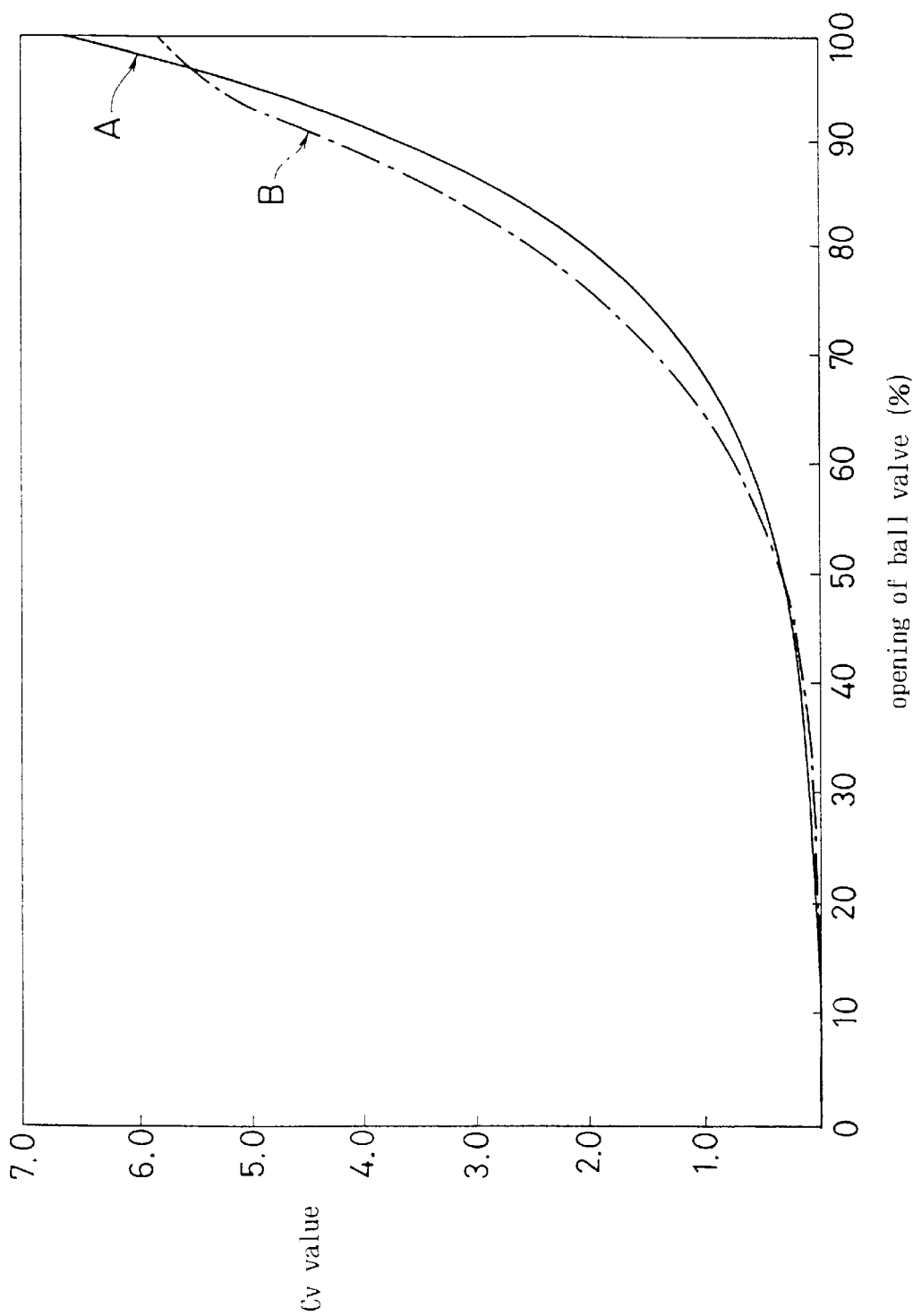
FIG. 6 is a chart showing the flow characteristic of the ball plug valve according to the first embodiment.

FIG. 6 shows experimental data which show the results of comparison in Cv value between A, in which the passage surface 13A of the flow through hole 13 of the ball 12 is formed convexly so that it bulges inward, and B in which the passage surface 13A of the flow through hole 13 of the ball 12 is formed concavely so that it is concave inward. It is recognized in FIG. 6 that the Cv value of A is larger than that of B at the end where the valve is fully opened.

⑥ The flow through hole 13 of the ball 12 on the side of the circular main opening 14 is equipped with the passage 19A communicating with the valve seat around the ball 12, while the flow through hole 13 on the sectorial opening 15 end is equipped with the passage 19C communicating with the valve chamber 11C around the ball 12. Therefore, the flow through hole 13 of the ball 12 produces a contraction flow from the side of the circular main opening 14 to the side of the sectorial opening 15, and the flow velocity is higher at the sectorial opening 15 than the circular main opening 14. This causes the static pressure at the side of the circular main opening 14 to become lower than at the side of the sectorial opening 15 and a resultant differential pressure is produced; therefore, the fluid jets into the valve chamber 11C through the communicating passage 19A at the circular main opening 14 end, while the fluid is drawn into the flow through hole 13 via the communicating passage 19C at the side of the sectorial opening 15. Thus, the fluid flows into both the flow through hole 13 in the ball 12 and the valve chamber 11C around the ball 12 at the same time, so that the valve chamber 11C does not become a dead space (liquid reservoir). Hence, the fluid does not cause such an inconvenience as the generation of bacteria which may be observed in a dead space, thus making the ball plug valve ideally suited for controlling the flow of pure water or ultrapure water or for other similar applications.

In the ball plug valve 10, two sides, namely a and b, which intersect at the tip 15A of the sectorial opening 15 are shaped into a convex curve which bulges toward the centerline of the opening so that the flow characteristic exhibits an equal percent characteristic (the increasing flow percentage is equal to the same increment as the valve opening).

Figure 4:
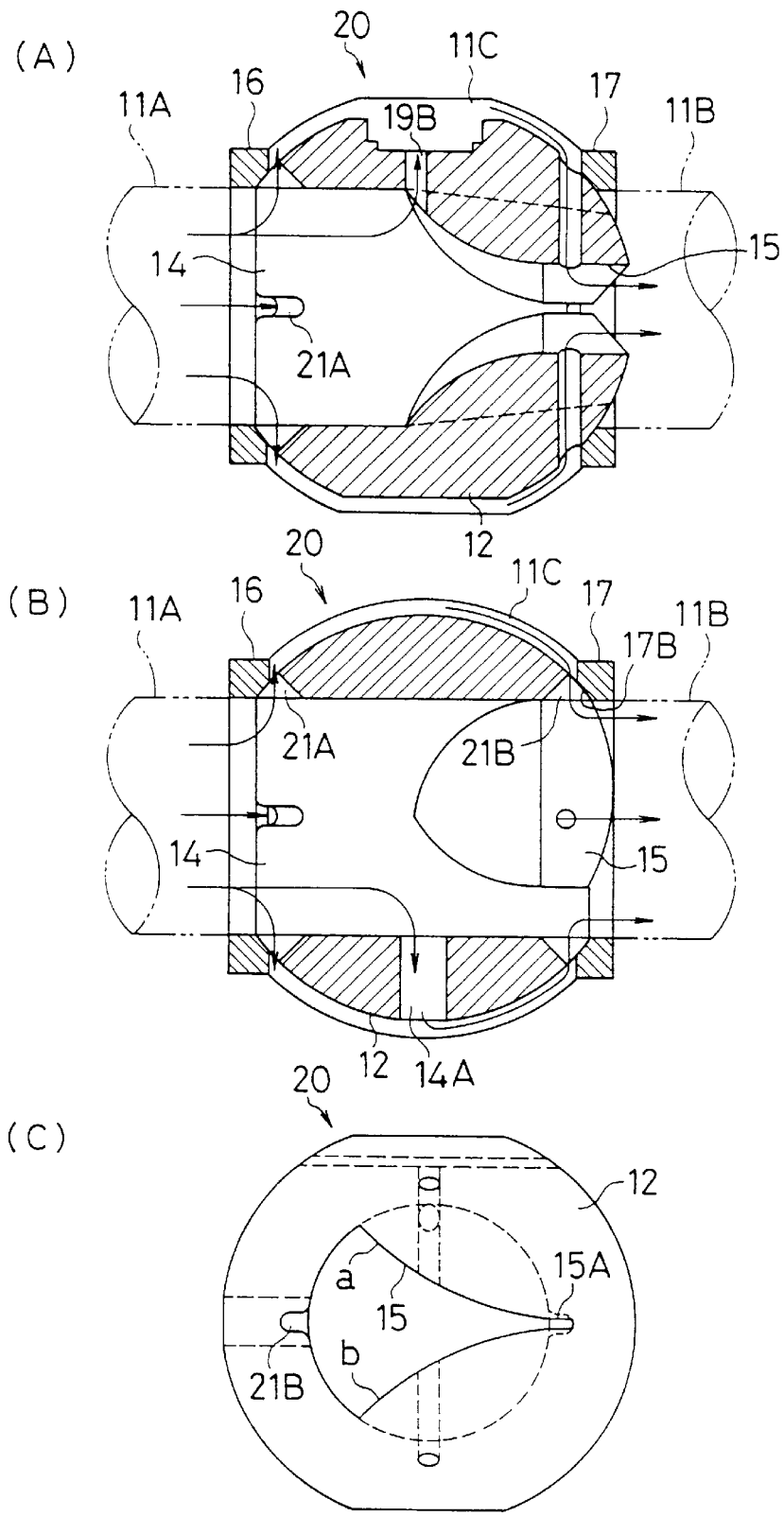
FIGS. 4a–4c are schematic diagrams showing an essential section of a ball plug valve according to a second embodiment.

(Second Embodiment) (FIG. 4)

A ball plug valve 20 according to a second embodiment differs from the foregoing ball plug valve 10 only in that the aperture-shaped communicating passages 19A and 19C, which are provided at the circular main opening 14 and the sectorial opening 15, respectively to prevent a fluid from stagnating in the valve chamber 11C, have been replaced by slit communicating passages 21A and 21B.

Figure 5:
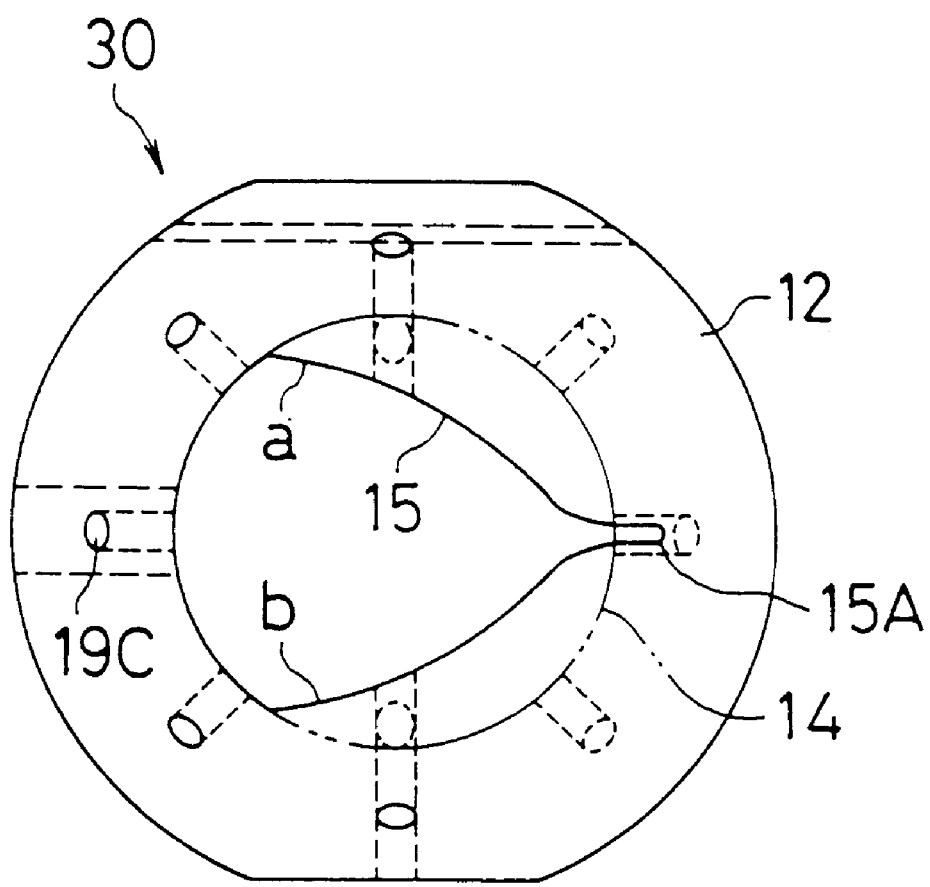
FIG. 5 is a schematic diagram showing an essential section of a ball plug valve according to a third embodiment.

(Third Embodiment) (FIG. 5)

A ball plug valve 30 according to a third embodiment differs from the foregoing ball plug valve 10 only in that the two sides, namely a and b, which intersect at the tip 15A of the sectorial opening 15, are shaped into a concave curve with respect to the centerline of the opening so that the flow characteristic exhibits the linear characteristic (the flow rate is changed in direct proportion to the opening of the valve).

Figure 7:
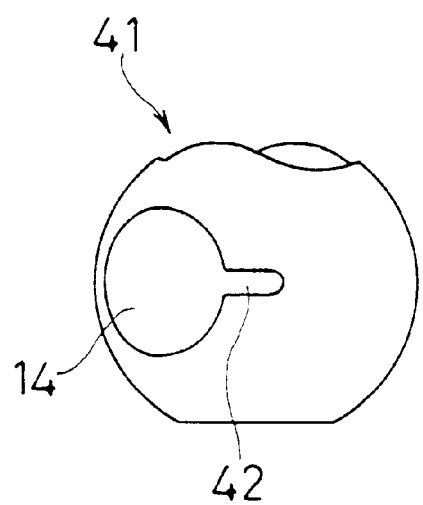
FIGS. 7a–7b are schematic diagrams showing a ball of a ball plug valve according to a fourth embodiment.
Figure 7:
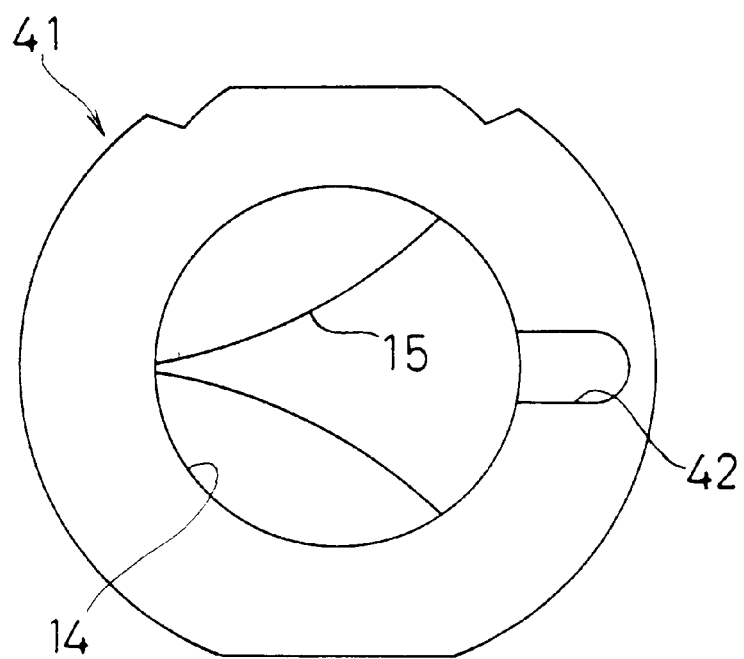
Figure 8:
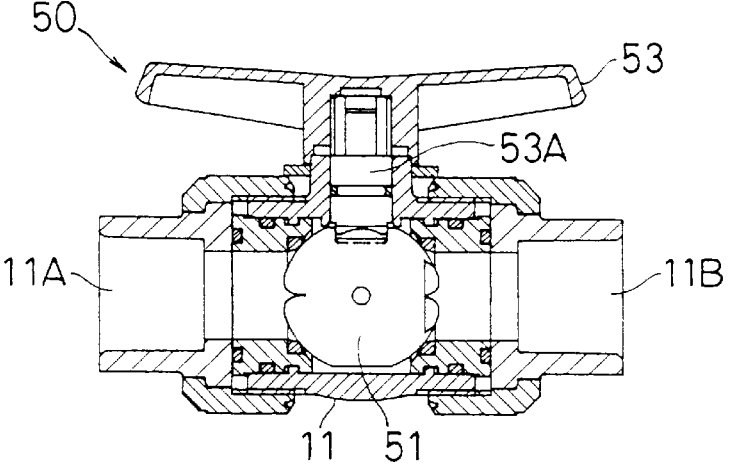
FIGS. 8a–8c are schematic diagrams showing a ball plug valve according to a fifth embodiment.
Figure 8:
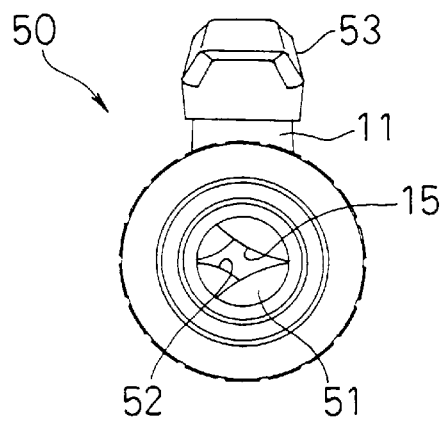
Figure 8:
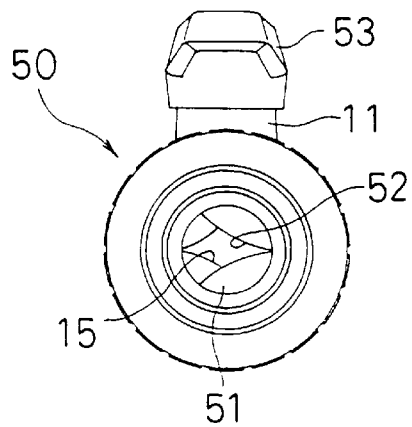

(Fourth Embodiment) (FIG. 7)

A ball plug valve 40 according to a fourth embodiment differs from the ball plug valve 10 only in that an auxiliary opening 42 of a ball 41 which replaces the ball 12 communicates with the circular main opening 14 in the form of a groove in the rotational circumferential direction of the ball 12. The auxiliary opening 42 puts the inlet passage 11A in communication with the flow through hole 13 at the start of the opening of the valve when the tip 15A of the sectorial opening 15 passes by the first sealing region 17A substantially in the same fashion as the auxiliary opening 14A of the ball plug valve 10.

(Fifth Embodiment) (FIG. 8 through FIG. 11)

A ball plug valve 50 according to a fifth embodiment differs from the ball plug valve 10 in that an inlet main opening 52 of a ball 51 which replaces the ball 12 is sectorial (the same shape as that of the outlet sectorial opening 15) rather than circular.

In the ball plug valve 50, at the side of the valve opening start and at the side of a small flow where the tip 15A of the outlet sectorial opening 15 is put in communication with the outlet passage 11B, a tip 52A of an inlet sectorial main opening 52 communicates with the inlet passage 11A. At the side of the fully opened valve and at the side of a large flow where the large end 15B of the outlet sectorial opening 15 is aligned with the peripheral section of the outlet passage 11B so as to widely open the sectorial opening 15 fully over the outlet passage 11B, the large end 52B of the inlet sectorial main opening 52 is aligned with the peripheral section of the inlet passage 11A so as to widely open the sectorial main opening 52 fully over the inlet passage 11A.

In the ball plug valve 50 according to the fifth embodiment, a manual operating handle 53 is connected to the ball 51 via a valve stem 53A. It is obvious that the manual operating handle 53 may alternatively be the control section composed of the electric actuator mentioned in the first embodiment.

Figure 9:
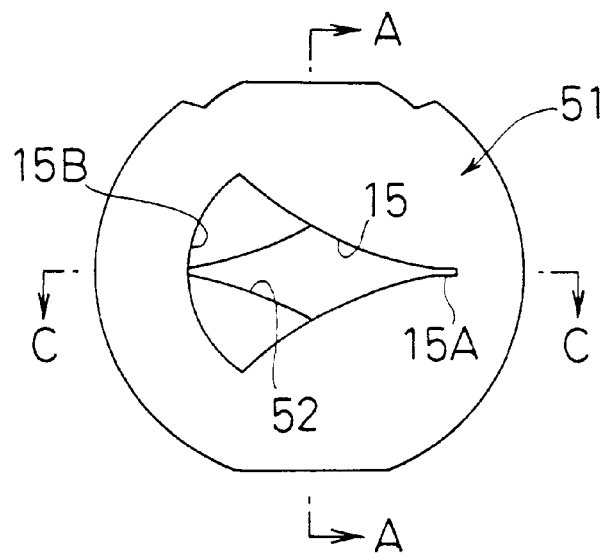
FIG. 9 is a front view showing a ball of the ball plug valve according to the fifth embodiment.
Figure 10:
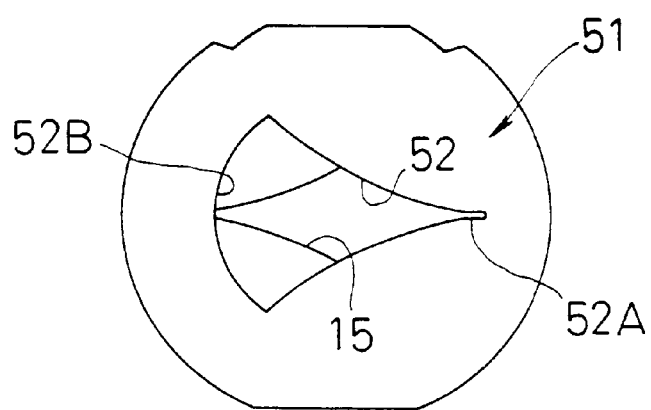
FIG. 10 is a rear view of the ball shown in FIG. 9.
Figure 11:
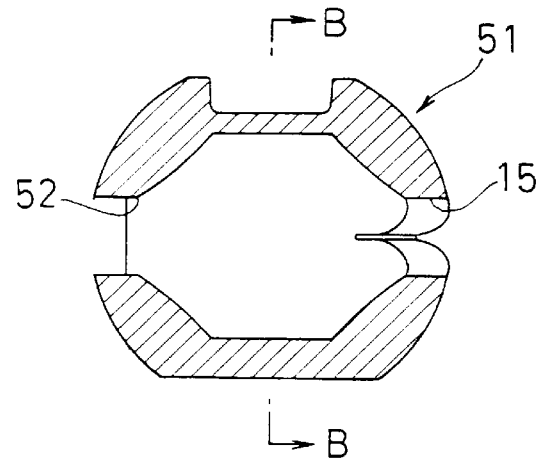
FIGS. 11a–11c are sectional views of the ball shown in FIG. 9.
Figure 11:
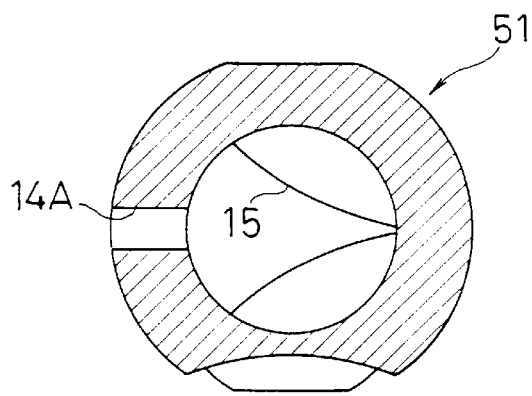
Figure 11:
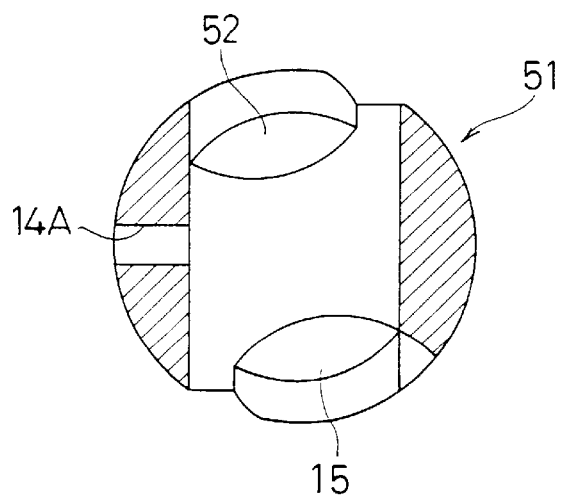
Figure 12:
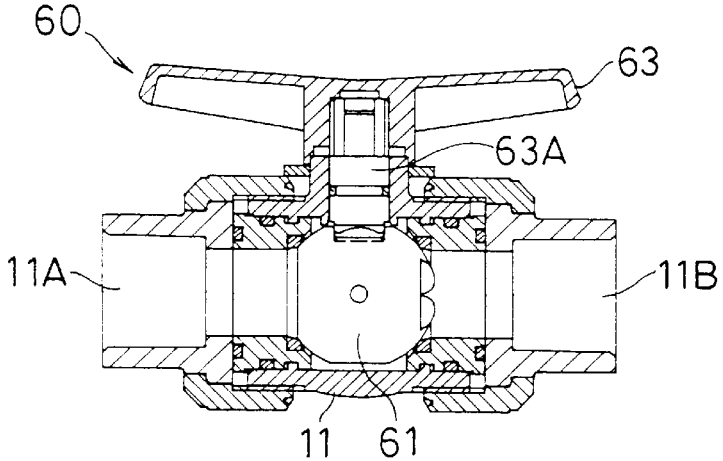
FIGS. 12a–12c are schematic diagrams of a ball plug valve according to a sixth embodiment.
Figure 12:
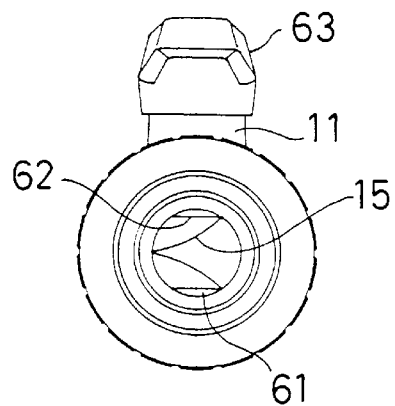
Figure 12:
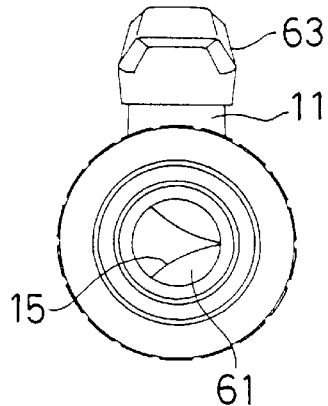

In the fifth embodiment, FIG. 11(A) is a sectional view taken on A—A shown in FIG. 9; FIG. 11(B) is a sectional view taken on B—B shown in FIG. 11(A); and FIG. 11(C) is a sectional view taken on C—C shown in FIG. 9.

(Sixth Embodiment) (FIG. 12 through FIG. 15)

A ball plug valve 60 according to a sixth embodiment differs from the ball plug valve 10 in that the inlet main opening 62 of a ball 61 which replaces the ball 12 is an elliptic main opening rather than the circular main opening.

In the ball plug valve 60 according to the sixth embodiment, a manual operating handle 63 is connected to a ball 61 via a valve stem 63A. It is obvious that the manual operating handle 63 may alternatively be the control section composed of the electric actuator mentioned in the first embodiment.

Figure 13:
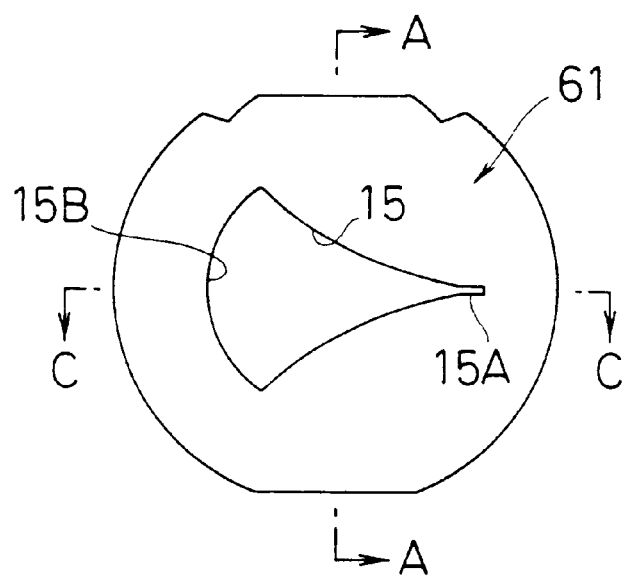
FIG. 13 is a front view showing a ball of the ball plug valve according to the sixth embodiment.
Figure 14:
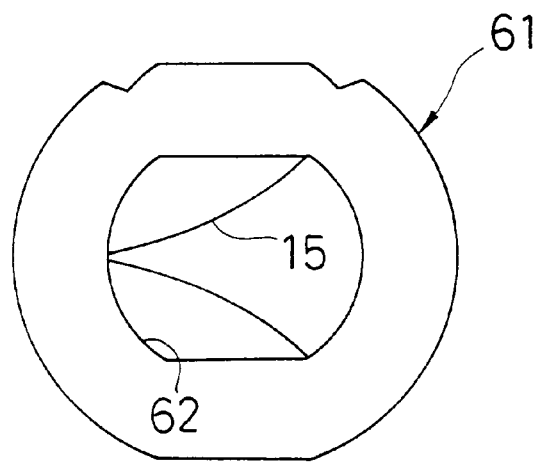
FIG. 14 is a rear view of the ball shown in FIG. 13.
Figure 15:
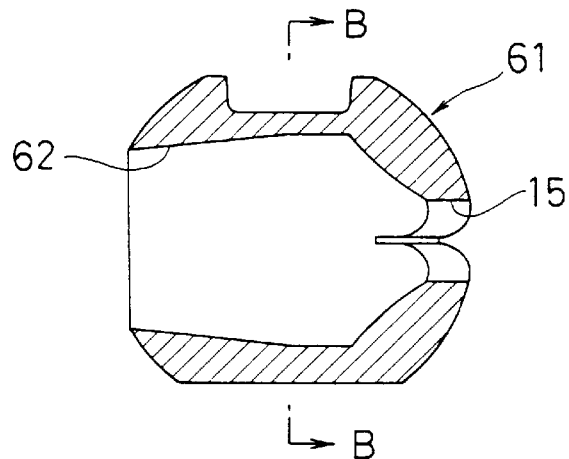
FIGS. 15a–15c are sectional views of the ball shown in FIG. 13.
Figure 15:
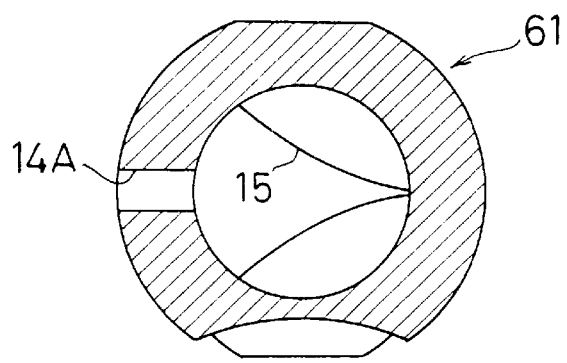
Figure 15:
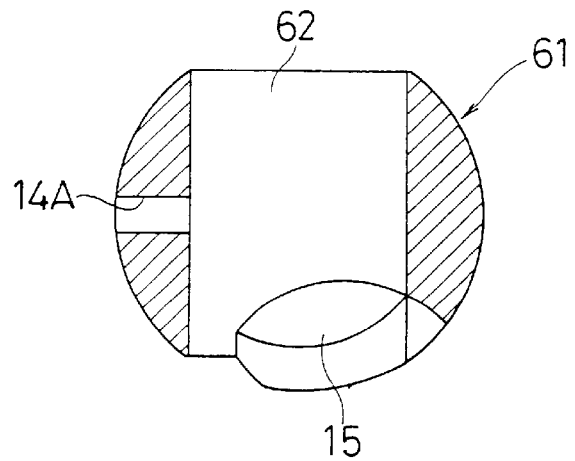

In the sixth embodiment, FIG. 15(A) is a sectional view taken on A—A shown in FIG. 13; FIG. 15(B) is a sectional view taken on B—B shown in FIG. 15(A); and FIG. 15(C) is a sectional view taken on C—C shown in FIG. 13.

The embodiments according to the present invention have been described in detail, however, specific configurations according to the present invention are not limited to the embodiments described above; design modifications or the like within a scope which does not depart from the spirit of the invention are also covered by the present invention. For example, the control section may be designed to be of a manual type instead of an electric actuator type. If the ball plug valve is not provided for controlling a fluid such as pure water and ultrapure water or for other similar application, then it will not be necessary to provide the aforesaid communicating passage 19A, etc.

INDUSTRIAL APPLICABILITY

According to the present invention, in a ball plug valve, it is possible to achieve a quicker fluid start after the valve is opened through a control section, a broader band wherein a fluid can be controlled through the control section, and higher fluid control accuracy.

What is claimed is:

1. A ball plug valve, comprising: a valve body having an inlet passage and an outlet passage, a ball having a flow through hole and at least two opening ends, the ball being disposed between the inlet passage and the outlet passage, sealing members in contact with the opening ends of the ball, a valve stem in a connectable relationship with the ball, a control section connectable with the ball via the valve stem, at least one of the opening ends being an outlet end, the outlet end having a sectorial opening, the sectorial opening having a tip being disposed in a first sealing region defined by at least one of the sealing members when the valve is fully closed, and being disposed in a second sealing region defined by at least one of the sealing members when the valve is fully open, the tip passing across the outlet passage during opening and closing of the valve, the flow through hole having an inlet opening, the inlet opening having a main opening and an auxiliary opening, the auxiliary opening arranged and constructed to allow communication between the inlet passage and the flow through hole during the period the valve is beginning to open and the tip of the sectorial opening passes the first sealing region, and the main opening is arranged and constructed to allow communication between the inlet passage and the flow through hole after the valve has begun to open.

2. A ball plug valve according to claim 1, wherein said flow through hole of the ball is composed of an intra-valve passage which provides smooth connection between the main opening and the sectorial opening.

3. A ball plug valve according to claim 2, wherein said flow through hole of the ball is composed of an intra-valve passage which is shaped convexly toward the inside of said flow through hole.

4. A ball plug valve according to claim 2, further comprising a communicating passage which puts the flow through hole on the main opening end of said ball in communication with a valve chamber around said ball, and a communicating passage which puts the flow through hole on the sectorial opening end in communication with the valve chamber around said ball.

5. A ball plug valve according to claim 1, wherein said flow through hole of the ball is composed of an intra-valve passage which is shaped convexly toward the inside of said flow through hole.

6. A ball plug valve according to claim 5, further comprising a communicating passage which puts the flow through hole on the main opening end of said ball in communication with a valve chamber around said ball, and a communicating passage which puts the flow through hole on the sectorial opening end in communication with the valve chamber around said ball.

7. A ball plug valve according claim 6, further comprising a communicating passage which puts the flow through hole on the main opening end of said ball in communication with a valve chamber around said ball, and a communicating passage which puts the flow through hole on the sectorial opening end in communication with the valve chamber around said ball.

* * * * *